(12) United States Patent
Ringer

(10) Patent No.: US 9,103,545 B2
(45) Date of Patent: Aug. 11, 2015

(54) INPUT/OUTPUT MODULE WITH DISPLAY ELEMENT

(71) Applicant: Siemens Aktiengesellschaft, Munich (DE)

(72) Inventor: Ulrich Ringer, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 13/856,898

(22) Filed: Apr. 4, 2013

(65) Prior Publication Data

US 2013/0271951 A1    Oct. 17, 2013

(30) Foreign Application Priority Data

Apr. 17, 2012    (EP) ..................................... 12164373

(51) Int. Cl.
| | |
|---|---|
| *G02B 6/00* | (2006.01) |
| *F21V 33/00* | (2006.01) |
| *F21V 8/00* | (2006.01) |
| *H04Q 1/02* | (2006.01) |

(52) U.S. Cl.
CPC .............. *F21V 33/00* (2013.01); *G02B 6/0008* (2013.01); *H04Q 1/136* (2013.01)

(58) Field of Classification Search
CPC ....... F21V 33/00; F21V 15/01; G02B 6/0008; G09F 9/305; H04Q 1/136
USPC ............ 385/901, 133–135; 362/23.09, 23.16, 362/600
See application file for complete search history.

(56) References Cited

U.S. PATENT DOCUMENTS

| | | | | |
|---|---|---|---|---|
| 3,611,359 | A * | 10/1971 | Panerai et al. ........... | 340/815.43 |
| 6,104,371 | A * | 8/2000 | Wang et al. .................... | 345/102 |
| 7,369,725 | B2 * | 5/2008 | Takatori et al. ................. | 385/39 |
| 7,532,800 | B2 * | 5/2009 | Iimura .......................... | 385/146 |
| 8,164,474 | B2 | 4/2012 | James | |
| 8,705,914 | B2 * | 4/2014 | Ghosh et al. .................... | 385/31 |
| 2005/0244114 | A1 | 11/2005 | Chiasson et al. | |

FOREIGN PATENT DOCUMENTS

WO    WO 2007/051976 A1    5/2007

* cited by examiner

*Primary Examiner* — Ellen Kim
(74) *Attorney, Agent, or Firm* — Cozen O'Connor

(57) ABSTRACT

An input/output module includes a connection element having a plurality of connection points for connecting input or output lines, a housing that accommodates the connection element such that the connection points are accessible and visible, display elements each including a plurality of status displays, each with a fiber-optic conductor associated with a status display, where a fiber-optic conductor includes a first illuminated panel and a light inlet, where a light source is arranged in the interior of the housing such that light is fed into the fiber-optic conductor via the light inlet and exits via the first illuminated panel to display a status, where the first illuminated panel is arranged in an end face of a side wall, and where the fiber-optic conductor is held in the side wall via a receptacle in the end face of the side wall.

9 Claims, 3 Drawing Sheets

INPUT/OUTPUT MODULE WITH DISPLAY ELEMENT

BACKGROUND OF THE INVENTION

1. Field of the Invention

The invention relates to an input/output module comprising a connection element including a plurality of connection points for connecting input or output lines, a housing that accommodates the connection element such that the connection points are accessible and visible, display elements, where the display elements have a plurality of status displays, each with a fiber-optic conductor associated with a status display.

2. Description of the Related Art

In industrial process automation increasing use is being made of automation systems that can be built up modularly. These automation systems preferably comprise different modules, such as a power pack, a programmable logic controller, one or more communication modules and input/output modules for connecting connection lines that lead into the industrial process to be controlled.

The input/output modules have channel status displays which, for example, are implemented using a combination of LED and fiber-optic conductors at a front side of these modules.

SUMMARY OF THE INVENTION

It is an object of the invention to improve the luminosity of an optical display in the case of input/output modules with connection points.

This and other objects and advantages are achieved in accordance with the invention by an input/out module comprising a connection element having a plurality of connection points for connecting input or output lines, a housing that accommodates the connection element such that the connection points are accessible and visible, display elements, where the display elements have a plurality of status displays, each with a fiber-optic conductor associated with a status display. In addition, a fiber-optic conductor is provided that includes a first illuminated panel and a light inlet, where a light source is arranged in the interior of the housing such that the light is fed into the fiber-optic conductor via the light inlet and exits via the first illuminated panel to display a status. Here, the first illuminated panel is arranged in an end face of a side wall such that the fiber-optic conductor is held in the side wall via a receptacle in the end face of the side wall, where the fiber-optic conductor essentially adheres, in the region of the first illuminated panel, to the material of the side wall in the receptacle because of the receptacle part of the peripheral surface, where because of the adhesion a permanent connection prevails, as a result of which the fiber-optic conductor is held, and where a preponderant part of the peripheral surface of the fiber-optic conductor is decoupled from the material of the side wall, as a result of which transmission of the light to the first illuminated panel is improved.

According to the prior art, transparent fiber-optic conductors for the status displays have been locked in place into an opaque housing part. The structural unit of a status display thus consisted of a fiber-optic conductor and a housing part. In the presently contemplated embodiment of the input/output module, the fiber-optic conductor is preferably introduced into the housing part or into the end surface of the side wall of the housing using a dual-component injection molding process. To increase luminous efficiency at the illuminated panel, it is advantageous if only part of the overall peripheral surface of the fiber-optic conductor enters into a permanent connection with the end face of the side wall of the housing.

It has been found that fiber-optic conductors lose a significant amount of effectiveness at locations at which they enter into a direct connection with a housing material. The direct connection arises during an injection molding process by the fiber-optic conductor being molded over and onto the housing material. If light beams from a light source hit a barrier layer between two media of different optical density, they are not simply reflected, but they pass from the optically denser medium, e.g., the fiber-optic conductor plastic, into an optically thinner medium, such as air, at the barrier layers between the two different media. Thus, in this case, the fiber-optic conductor plastic and the opaque housing plastic; a light wave is no longer totally reflected and thus the light loses intensity. Because as a result of the overmolding the fiber-optic conductor has entered into a permanent connection only in a relatively small part of the housing, the transmission of light to the end face of the module for the illuminated panel of the fiber-optic conductor is improved.

A further improvement is achieved if the side wall is configured such that between the preponderant part of the peripheral surface of the fiber-optic conductor and the side wall a cavity is configured such that the material of the side wall does not touch a preponderant part of the fiber-optic conductor.

If a second illuminated panel is arranged in a lateral surface of the side wall aligned toward the connection element at the level of a connection point, an optical display in the immediate vicinity of the connection point is also improved and diagnosis is facilitated. If in a thus configured input/output module a diagnosis is required during operation of the module, then a fitter or commissioning engineer can approach the module and obtain information about the status of the module by means of the status displays just from a rough plan view of the module. As the first illuminated panel is arranged in an end face of a side wall of the housing, where the end face is part of the front of the module, the status of this module is clearly signaled. If this diagnosis then goes a step further where, for example, it is necessary to prove whether a particular input or output line really carries a particular signal at a certain time, the commissioning engineer or fitter must inspect the module in greater detail which, for example, means that he checks a particular color combination of a connection line to see whether as per the circuit diagram it really is located at the connection point intended for it. This check is facilitated for the commissioning engineer or fitter in that the second illuminated panel of the fiber-optic conductor is arranged at the level of the connection point and thereby directly illuminates the connection point in question.

In a further embodiment of the input/output module, it is advantageous if the fiber-optic conductor is configured as one piece and the surface in the region of the second illuminated panel is provided with an optical calculation point. This type of configuration ensures that not only does a display illuminate by means of the fiber-optic conductor via the first illuminated panel at the front of the module, but also in addition that sufficient signal-emitting light is generated directly at the wiring of the connection point.

Because of space constraints in input/output modules, it has proven advantageous to arrange a carrier for the light source, i.e., an LED, in the side wall. In the case of particularly narrow side walls, it is advantageous to configure the carrier as a foil with conductor tracks.

To improve the light shining onto the connection point, i.e., onto the wiring point, it is advantageous if the fiber-optic conductor has a recess that is configured as the light inlet and into which the light source is fitted. In this case, particularly good diagnostic results are achieved if the light feed point is arranged essentially opposite the second illuminated panel, in order to improve the optical display in the immediate vicinity of the connection point.

Furthermore it is advantageous, if the light source on the carrier is an SMD LED.

In order to provide an input/output module with as many input or output lines as possible, it is advantageously configured such that the housing has a first side wall and a second side wall, where the connection element is arranged between the two side walls and includes a first row and a second row of connection points, where the first row extends lengthways parallel to the first side wall and the second row lengthways parallel to the second side wall.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained below in greater detail on the basis of the drawing, in which.

DETAILED DESCRIPTION OF THE PREFERRED EMBODIMENTS

Figure 1:
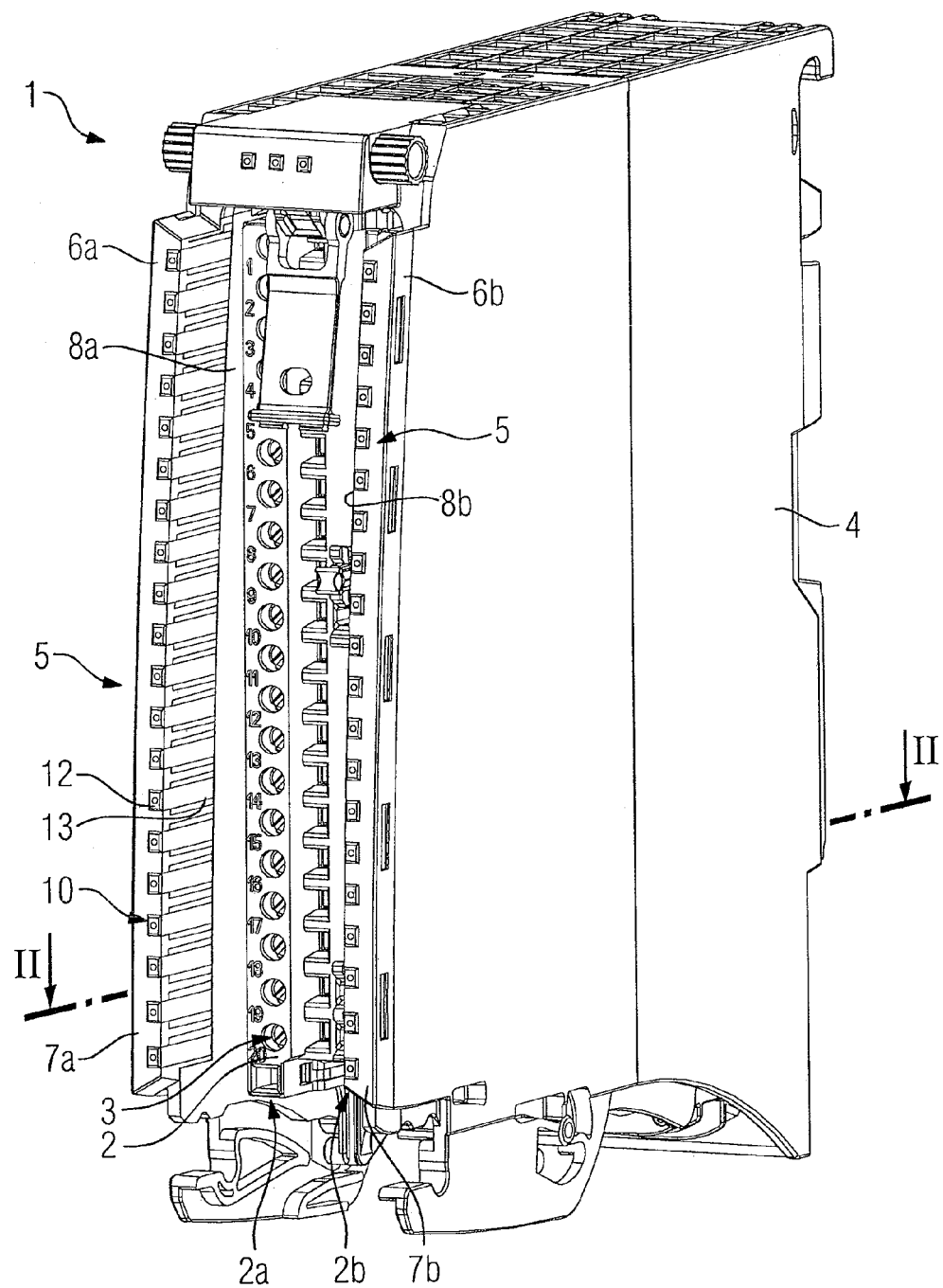
FIG. 1 shows an input/output module in a three-dimensional plan view.

FIG. 1 illustrates an input/output module 1, comprising a connection element 2 with a plurality of connection points 3 for connecting input or output lines, a housing 4 that accommodates the connection element 2 such that the connection points 3 are accessible and visible, and display elements 5, where the display elements 5 have a plurality of status displays, each with a fiber-optic conductor 10 associated with a status display.

In the three-dimensional plan view of the input/output module 1 the housing 4 has a first side wall 6a on the left and a second side wall 6b on the right. Here, the connection element 2 is arranged between the two side walls 6a,6b, where a first row 2a and a second row 2b of connection points 3 extend parallel to the side walls 6a,6b.

The connection element 2 has the rows 2a,2b with the connection points 3 on its top side. On its underside, the connection element 2 has plug contacts (not visible in this drawing) which create a connection to electronic components in the interior of the input/output module. Here, the plug contacts are in turn coupled to the individual connection points. The fiber-optic conductor 10 is embedded in the side walls 6a,6b such that it fits flush with an inward-facing lateral surface 8a,8b of the side walls 6a,6b. In this arrangement, a first illuminated panel 12 of the fiber-optic conductor 10 protrudes out of the end faces 7a,7b of the side walls 6a,6b. A second illuminated panel 13 of the fiber-optic conductor 10 is arranged in the lateral surfaces 8a,8b of the side walls 6a,6b at the level of the connection point 3, as a result of which an optical display is formed in the immediate vicinity of the connection point and a diagnosis is facilitated for a commissioning engineer or fitter.

Figure 2:
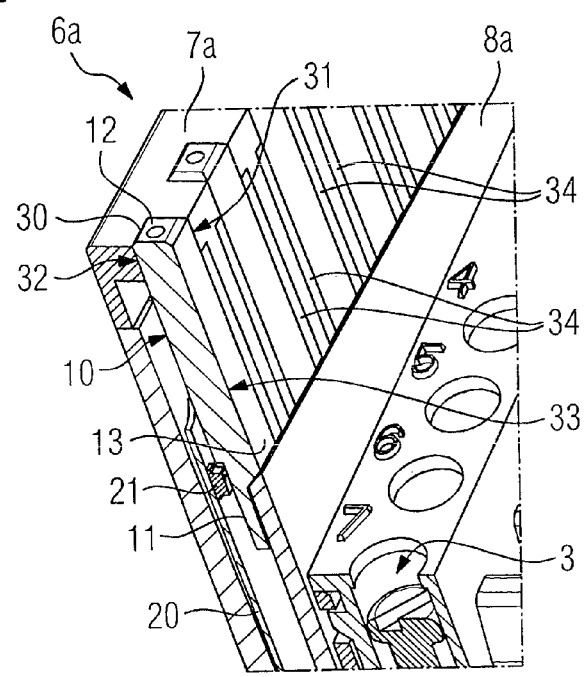
FIG. 2 shows a section from the input/output module illustrated in FIG. 1.

FIG. 2 shows a section of the input/output module 1 illustrated in FIG. 1. Essentially, the first end face 7a and the first lateral surface 8a of the input/output module 1 are illustrated. The fiber-optic conductor 10 is embedded in a right-hand region of the first end face 7a, with the fiber-optic conductor 10 being configured in one piece and the surface in the region of the second illuminated panel 13 being provided with an optical refraction point. The fiber-optic conductor 10 with its illuminated panel 12 is embedded in a receptacle 30 in the end face 7a. Due to the receptacle 30, the fiber-optic conductor 10 is held in the end face 7a essentially in the region of the first illuminated panel 12 by a part of its peripheral surface 32. Due to a dual-component injection molding process a permanent connection has been achieved, by overmolding the fiber-optic conductor 10 onto the housing part, between the material of the housing part, here in particular the end face 7a, and the material of the fiber-optic conductor 10. A preponderant part 33 of the peripheral surface of the fiber-optic conductor 10 is decoupled from the material of the side wall 6a, as a result of which transmission of the light to the first illuminated panel 12 is improved.

A very obvious decoupling is achieved if a cavity 34 is arranged between the preponderant part of the peripheral surface 32 of the fiber-optic conductor 10 and the side wall 6a and is configured such that a preponderant part of the material of the side wall 6a does not touch the material of the fiber-optic conductor 10. It is thus advantageous if the barrier layer between the material of the fiber-optic conductor 10 and the material of the housing is decoupled either by a cavity or else is decoupled such that no adhesion exists between both materials, in particular a hydrocarbon chain bond.

The relatively narrow side wall 6a compared to the overall width of the module has a further cavity. A carrier 20 is embedded in this further cavity. As the further cavity for example only has an expansion of 3 millimeters, the carrier 20 is configured as a thin foil, where this foil carries conductor tracks and a light source 21 is applied to this foil. The light source 21 is configured as an SMD LED. In order to bring the light source 21 as close as possible to the fiber-optic conductor 10, the fiber-optic conductor 10 is provided with a recess which forms a light inlet 11. The light radiation generated by the SMD LED can thus penetrate the fiber-optic conductor 10 unobstructed and does not, as hitherto usual, simply exit at the first illuminated panel 12, but also at the second illuminated panel 13 in order to form a light shining onto the connection point 3 and thus facilitate a diagnosis.

The alternative embodiment of the fiber-optic conductor 10 in FIG. 2 is configured such that the fiber-optic conductor 10 forms a rod-shaped element, which was injected into the end face 7a, and the recess is configured such that if the first illuminated panel 12 is flush with the end face 7a the recess, in other words the light inlet 11, rests on the SMD LED in form-fit manner.

Figure 3:
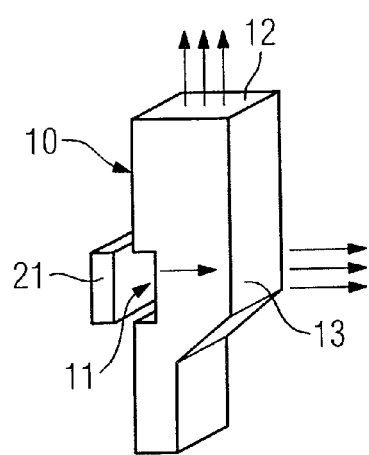
FIG. 3 shows a configuration of a fiber-optic conductor in accordance with a first embodiment.

FIG. 3 shows a further alternative embodiment of the fiber-optic conductor 10. Here, the light inlet 11 is configured such that the light source 21 can be pressed snugly into the fiber-optic conductor 10. The light inlet 21 is arranged opposite the second illuminated panel 3, the arrangement improving the optical display in the immediate vicinity of the connection point 3. A light beam is indicated by three parallel routed arrows. The light beam can thus exit simultaneously from the first illuminated panel 12 and the second illuminated panel 13.

Figure 4:
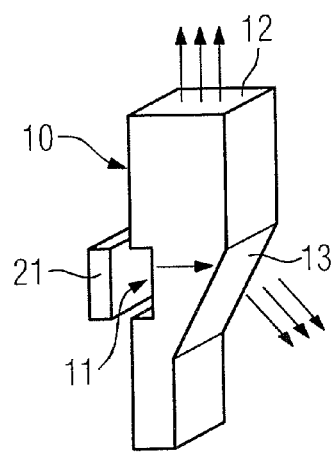
FIG. 4 shows a configuration of a fiber-optic conductor in accordance with a second embodiment.

FIG. 4 illustrates a further optimization of the illumination of the connection point 3 with a further rod-shaped alternative embodiment of the fiber-optic conductor 10. Because the second illuminated panel 13 is arranged on a sloping surface of the fiber-optic conductor 10, where the light source 21 is arranged opposite the sloping surface, the light beam fed into the light inlet from the light source 21 can thus be fed into the fiber-optic conductor 10 as in a prism and can exit from the second illuminated panel 13 at a 45° angle. The light can as a result be aligned to shine directly onto the connection point 3.

Figure 5:
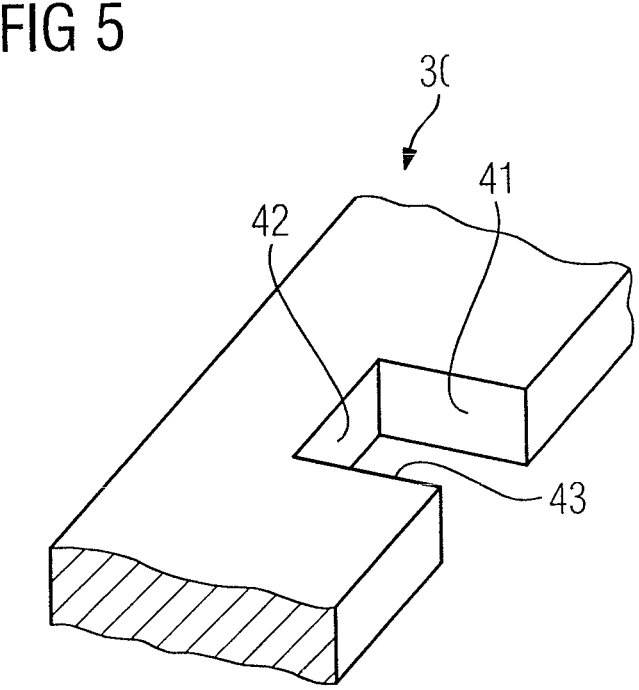
FIG. 5 shows a receptacle for a fiber-optic conductor.

FIG. 5 illustrates a section of the side wall 6a with the end surface 7a and the receptacle 30. The receptacle 30 provides, for contact with the fiber-optic conductor 10, a first interior surface 41, a second interior surface 42 and a third interior surface 43. In the dual-component injection molding processes the fiber-optic conductor 10 can be overmolded onto the three interior surfaces 41,42,43 and is thus held in the end face 7a of the housing. Due to the overmolding process, part of the peripheral surface of the fiber-optic conductor 10 enters into a permanent connection with the interior surfaces 41,42, 43 of the receptacle 30.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. An input/output module, comprising:
    a connection element including a plurality of connection points for connecting input or output lines;
    a housing which accommodates the connection element such that the connection points are accessible and visible;
    display elements including a plurality of status displays, each display element having a fiber-optic conductor associated with a status display, a fiber-optic conductor including a first illuminated panel, a light inlet and a recess which is configured as the light inlet and into which the light source is fitted, a light source being arranged in an interior of the housing such that light is fed into the fiber-optic conductor via the light inlet and exits via the first illuminated panel to display a status, the first illuminated panel being arranged in an end face of a side wall; and
    a receptacle in the end face of the side wall, the fiber-optic conductor being held in the side wall via the receptacle;
    wherein the receptacle causes part of a peripheral surface of the fiber-optic conductor to adhere to material of the side wall in the receptacle only in a region of the first illuminated panel due to the receptacle;
    wherein the adhesion causes a permanent connection such that the fiber-optic conductor is held in place;
    wherein a part of the peripheral surface of the fiber-optic conductor is decoupled from the material of the side wall such that transmission of light to the first illuminated panel is improved;
    wherein the side wall is configured such that a cavity is arranged between the part of the peripheral surface of the fiber-optic conductor and the side wall and is further configured such that the material of the side wall does not touch the fiber-optic conductor; and
    wherein the fiber-optic conductor is configured as one piece and a surface in a region of a second illuminated panel is provided with an optical refraction point.

2. The input/output module as claimed in claim 1, wherein the second illuminated panel is arranged in a lateral surface of the side wall and aligned toward the connection element at a level of a connection point such that an optical display is formed in an immediate vicinity of the connection point and a diagnosis is facilitated.

3. An input/output module, comprising:
    a connection element including a plurality of connection points for connecting input or output lines;
    a housing which accommodates the connection element such that the connection points are accessible and visible;
    display elements including a plurality of status displays, each display element having a fiber-optic conductor associated with a status display, a fiber-optic conductor including a first illuminated panel and a light inlet, a light source being arranged in an interior of the housing such that light is fed into the fiber-optic conductor via the light inlet and exits via the first illuminated panel to display a status, the first illuminated panel being arranged in an end face of a side wall;
    a receptacle in the end face of the side wall, the fiber-optic conductor being held in the side wall via the receptacle; and
    a second illuminated panel arranged in a lateral surface of the side wall and aligned toward the connection element at a level of a connection point such that an optical display is formed in an immediate vicinity of the connection point and a diagnosis is facilitated;
    wherein the receptacle causes part of a peripheral surface of the fiber-optic conductor to adhere to material of the side wall in the receptacle only in a region of the first illuminated panel due to the receptacle;
    wherein the adhesion causes a permanent connection such that the fiber-optic conductor is held in place;
    wherein a part of the peripheral surface of the fiber-optic conductor is decoupled from the material of the side wall such that transmission of light to the first illuminated panel is improved; and
    wherein the light inlet is arranged opposite the second illuminated panel to improve an optical display in an immediate vicinity of the connection point.

4. The input/output module as claimed in claim 1, further comprising:
    a carrier for the light source arranged in the side wall.

5. The input/output module as claimed in claim 1, wherein the carrier is configured as a foil with conductor tracks.

6. The input/output module as claimed in claim 1, wherein the light source comprises an SMD LED arranged on the carrier.

7. The input/output module as claimed in claim 1, wherein the housing includes a first side wall and a second side wall;

wherein the connection element is arranged between the first and second side walls and includes a first row and second row of connection points; and wherein the first row extends lengthways parallel to the first side wall and the second row lengthways parallel to the second side wall.

8. The input/output module as claimed in claim 1, wherein the light source is an LED.

9. The input/output module as claimed in claim 3, wherein the fiber-optic conductor is configured as one piece and a surface in a region of the second illuminated panel is provided with an optical refraction point.

* * * * *